United States Patent [19]
Angeloni

[11] 3,828,306
[45] Aug. 6, 1974

[54] HIGHWAY DISTRESS SYSTEM

[76] Inventor: Paul Angeloni, P.O. Box 33, Poland, Maine 04104

[22] Filed: Jan. 8, 1973

[21] Appl. No.: 321,818

[52] U.S. Cl. .................................................. 340/32
[51] Int. Cl. .............................................. G08g 1/12
[58] Field of Search ............. 340/22, 23, 24, 32, 33; 343/100 CS, 112 PT, 112 TC; 325/111, 117

[56] References Cited
UNITED STATES PATENTS

| | | | |
|---|---|---|---|
| 3,419,865 | 12/1968 | Chisholm | 340/24 |
| 3,441,858 | 4/1969 | Graham | 340/33 |
| 3,518,674 | 6/1970 | Moorehead et al. | 343/112 TC |
| 3,644,883 | 2/1972 | Borman et al. | 340/23 |
| 3,646,580 | 2/1972 | Fuller et al. | 340/24 |
| 3,659,085 | 4/1972 | Potter et al. | 343/112 TC |
| 3,680,121 | 7/1972 | Anderson et al. | 343/112 TC |
| 3,714,573 | 1/1973 | Grossman | 343/112 TC |

Primary Examiner—Kathleen H. Claffy
Assistant Examiner—Randall P. Myers
Attorney, Agent, or Firm—Robert Shaw

[57] ABSTRACT

A system for noting the existence of a distress-condition of an automobile (or other vehicle) and for locating the automobile relative to monitoring stations. The system employs a transmitter in the vehicle in distress, which is adapted to send a multi-directional signal indicative of the nature of the trouble to a limited geographical area around the vehicle. A plurality of radio direction finder stations in said region position the vehicle in difficulty and the vehicle driver is notified of that fact and is given any other pertinent information. The portion of the system on the vehicle has both a transmitter and a receiver which are automatically rendered effective as alternate conditions of system operation, thereby to send out distress information and to receive related information as alternate situations.

3 Claims, 3 Drawing Figures

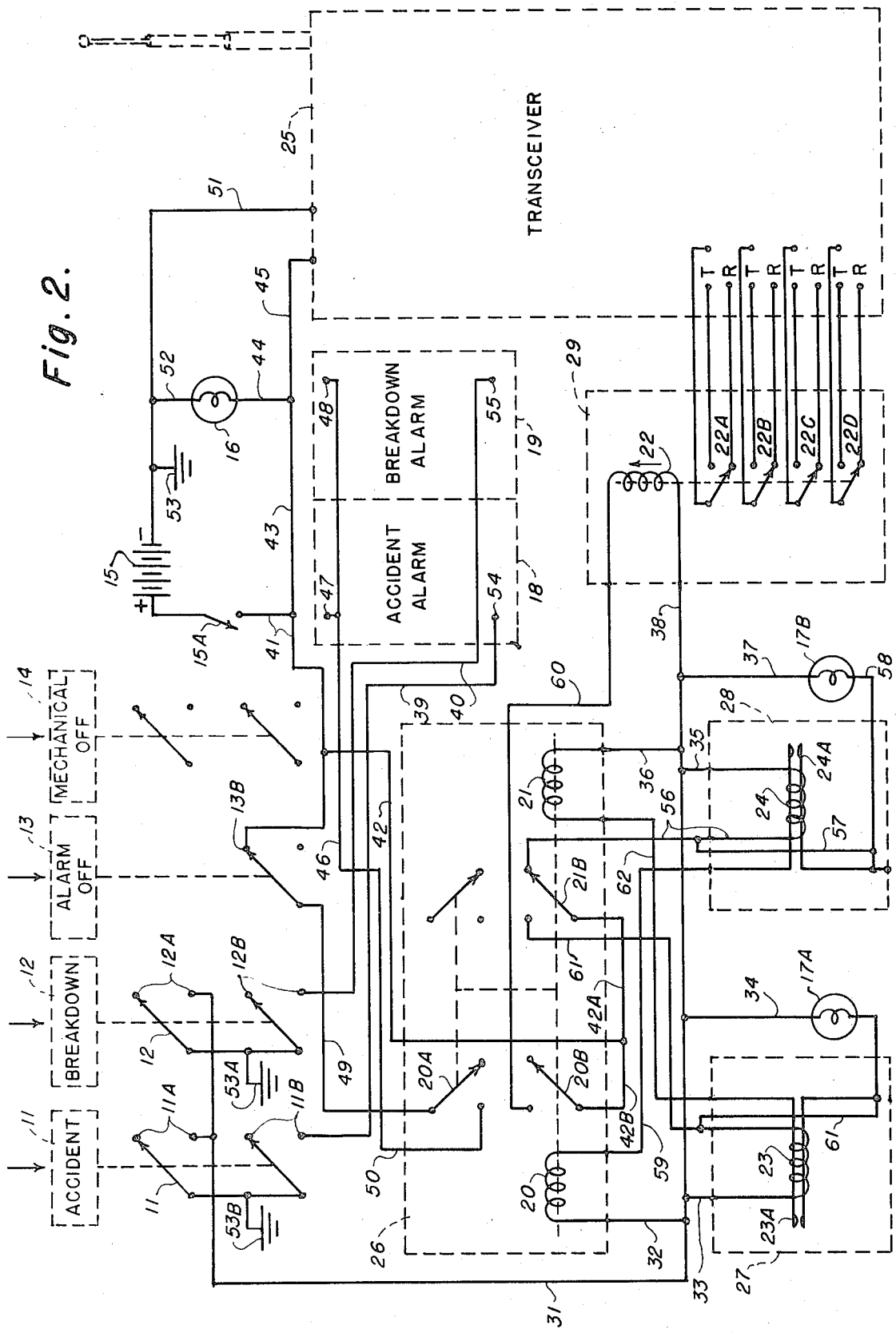

HIGHWAY DISTRESS SYSTEM

The present information relates to systems operable to locate vehicles in distress and, more particularly, to systems operable to indicate the position of motor vehicles having difficulty in a limited region of a larger geographical area.

In Pat. No. 3,680,043 granted July 25, 1972 to the present inventor, there is described a speed monitoring system for highway vehicles; the system disclosed can also function for emergency-type situations, but all are related to superhighway-type travel.

There exists a need for means to locate or position motor vehicles which have encountered conditions of breakdown or accident in other than superhighway travel. Such means, must be able to locate vehicles anywhere within a region, but, unlike those employed for aircraft and ships, must be operable in a limited geographical area; first, because relief cannot be expected to come from farther than 15 or so miles in eastern states of the United States and no more than 50 miles or so in western states, and, second, because of the large number of automobiles used and the possibility of a large number of simultaneous distress conditions. Thus, a principal object of the present invention is to provide a system for locating a vehicle in trouble and to limit in area the region in which such system is effective.

Another object is to provide a system which is economical to build in all aspects thereof.

Still another object is to supply a system which can be operated by only slightly trained personnel.

These and still further objects are found in the description that follows and are specifically pointed out in the appended claims.

The foregoing objects are embodied in a system for noting the existence of a distress-condition of a motor vehicle at a region of a highway, that comprises: transmitter means on the vehicle operable to send a multidirection R.F. signal from the vehicle to a limited geographical area around the vehicle, the occurrence of the signal being an indication of a distress-condition of the vehicle; a plurality of radio direction finding devices adapted to receive the signal and to position the source of the signal in terms of the direction thereof from each device; and means for plotting the direction from each radio direction finding device to the vehicle, the vehicle being located at the intersection of the plots.

The invention is hereinafter discussed with reference to the accompanying drawing in which:

FIG. 2 is a circuit diagram of apparatus for installation in the vehicle to send signals to the stations and to receive signals from the stations.

Figure 1:
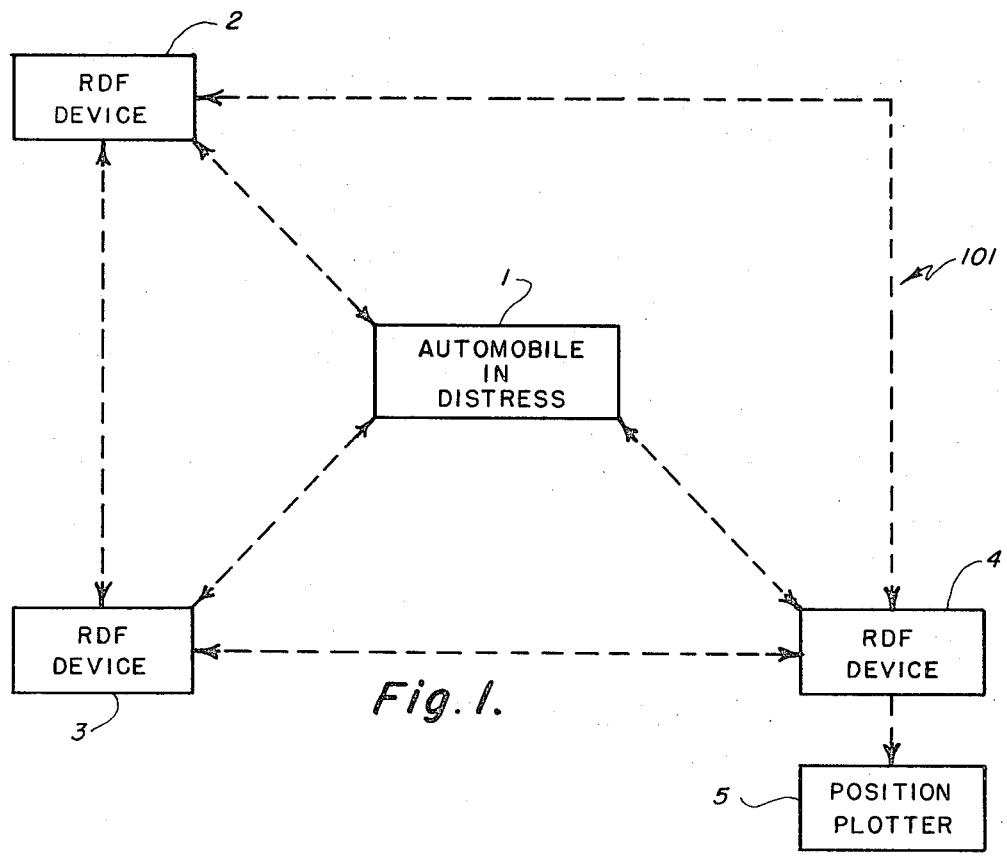
FIG. 1 is a diagrammatic representation of a system employing the present inventive concept and shows in block diagram form a vehicle in distress and three radio-direction finding stations to locate the vehicle.

Referring now to FIG. 1 a system 101 is shown for noting the existence of malfunctioning, accident or other distress-conditions of a motor vehicle 1 located at a region of a highway. A transmitter, which is part of the transceiver shown at 25 in FIG. 2, on the vehicle is operable to send a multi-directional R.F. signal from the vehicle to a limited geographical area around the vehicle location. The occurrence of the R.F. signal is an indication of a distress-condition of the vehicle. A plurality of radio-direction-finding devices 2, 3 and 4 are adapted to receive the signal and to position the source of the signal in terms of the direction thereof from each device. A position plotter 5 can then be employed to locate the vehicle. The position plotter can, of course, be a complex X-Y recorder adapted to receive inputs from the devices 2, 3 and 4 and to position the vehicle on the basis of the inputs. In practical apparatus, however, the RDF devices can be solid-state direction finders like the MR-18 Mariner marketed by Heathkit, and plotting can be manual as now explained in connection with FIG. 3.

Figure 3:
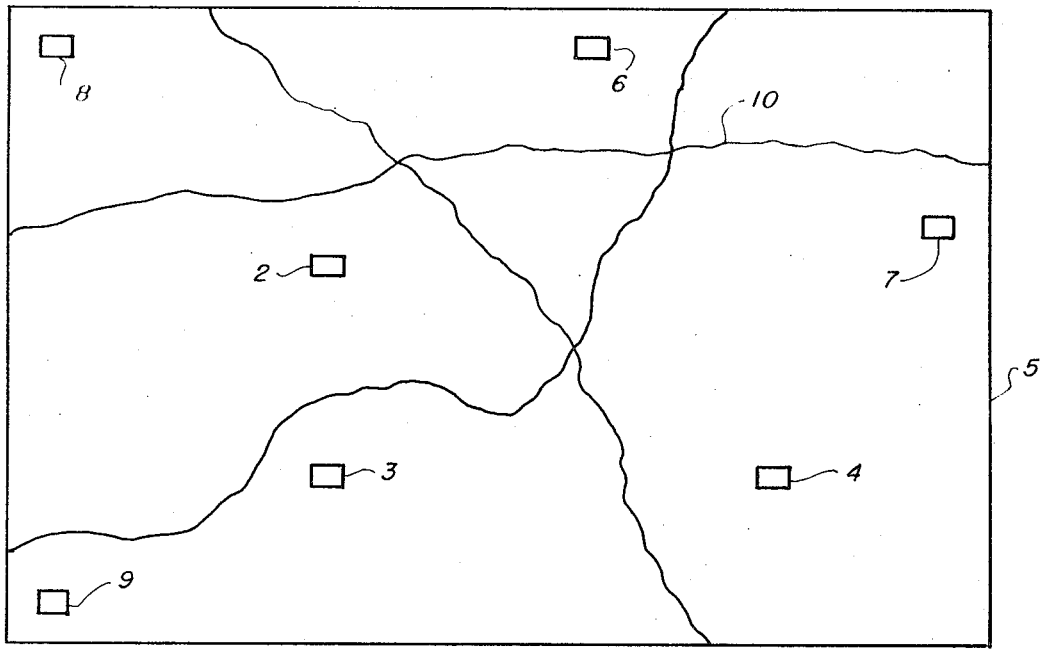
FIG. 3 shows a map of a limited geographical area with a plurality of said stations.

The position plotter 5 in FIG. 3 is a map-like unit which contains the location of roads 10 for a particular geographical area. There are also noted the locations of the RDF devices 2, 3 and 4 and further devices 6, 7, 8 and 9, any three of which (assuming such three are not located along a single line) can be employed to pinpoint an automobile experiencing an emergency situation. Thus, the stations 2 and 3, in the situation here discussed, can provide information in terms of the direction (in degrees from north) of the vehicle from each station. This information can be combined with like information from the RDF device 4, and the vehicle in distress can be then located upon the plotter 5 by plotting the three directions and noting the intersection thereof. The stations housing the devices 2,3,4, etc. will be ordinarily separated by ten to twenty miles; the numerals 2,3,4, etc. are intended to denote the stations as well as the RDF devices, and the stations include transmitters to send messages to the vehicle in distress and receivers. The transmitter in the vehicle (and in each of the stations) is UHF and, preferably, at a frequency the order of 450 MHz or more and low power of the order of 10 watts. It is, therefore, of limited local range. The signal sent out to indicate the existence of a distress situation can be, for example, a steady note which, as later explained, can exist for a given time period and might indicate an accident. An interrupted signal tone might indicate breakdown. The transceiver 25 also contains a receiver to receive a transmission from any one of the stations housing the RDF devices. The receiver is adapted to receive messages from vehicles in distress also, thereby to alert drivers, not in difficulty, of the existence of trouble, possibly in their immediate vicinity.

The apparatus at the various stations can be standard receivers and transmitters, and the RDF-devices can be standard units, as noted. The apparatus in each vehicle 1, however, is of a more specialized nature, as is now explained with reference to FIG. 2. The system shown in FIG. 2 is energized by closing an ignition switch 15A which allows a battery 15 to energize a conductor 41 connected to the terminal 13B of an alarm-off switch 13. The circuit is traced through the switch 13, which is shown in the normally closed position, to a conductor 49 and thence to a contact 20A of a latching relay 26. The normally open contact 20A, when switched by the coil 20 of the latching relay 26, completes a circuit through a conductor 50 to a conductor 46 which, in turn, is connected to a terminal 47 of an accident alarm 18 and then to a terminal 48 of a breakdown alarm 19. The conductor 41 also energizes a conductor 43 connected to a conductor 44 of an indicator lamp 16 and to a conductor 45 which is one lead to the transceiver 25. The conductor 41 is also connected to a conductor 42 which is a lead to contacts 20B and 21B of the latching relay 26. At this juncture in system operation, only the indicator lamp 16 and the transceiver 25 are energized, the circuit being as follows: battery 15 to the ignition contacts 15A and thence to the conductors 43, 44, 45 to energize the transceiver 25 and indicator lamp 16 and then through ground conductors 51 and 52 to ground 53. Thus, the lamp 16 at this juncture indicates that power is on and that the transceiver 25 is energized and in condition to receive.

If now the accident switch designated 11 is depressed, the contacts 11A thereof make a "grounding circuit" from a conductor 31 to ground 53B, the conductor 31 being connected to a conductor 32 connected to the coil 20 of the latching relay 26, to a conductor 33 connected to the coil 23 of a time relay 27, to a conductor 35 connected to the coil 24 of a time-relay 28, to a conductor 36 connected to a relay coil 21 of the latching relay 26, to conductors 34 and 37 connected respectively to indicator lamps 17A and 17B, and then, finally, to a conductor 38 connected to the coil 22 of a multi-contact relay 29, thereby completing the grounding circuit of the latching relay 26, and the circuits of the timer relay 27, the timer relay 28, the multi-contact relay 29 and, also, to the transmit indicator lamp 17A and the receiver indicator lamp 17B.

When the accident switch 11 is depressed (or closed) a circuit to ground 53B is completed through contacts 11B to a conductor 39 which is connected to a further terminal 54 of the accident alarm 18, thus allowing energy to flow through the conductor 46 to the terminal 47. The accident alarm, when energized, emits a signal which, for present purposes, can be a steady-tone sound. The sound is picked up by a microphone (not shown) in the transceiver 25, and is transmitted as an alarm signal to be picked up by the various RDF stations.

Closing the switch 11 also starts a timed switching cycle as now explained. As above noted, one side of the coil 24 is connected to ground 53B by the conductor 31 when the switch 11 is closed. The other side of the coil 24 connects by a conductor 56 to the latching relay contact 21B, which is shown in the "primary position," and by way of conductors 42A, 42 and 41 to the battery 15. The conductor 56 is also connected by a conductor 57 to one side of the timer relay contacts 24A of the timer relay 28. The conductor 57 is also connected to a conductor 58 which is connected to one side of the receiver indicator lamp 17B allowing the lamp to become energized through the "grounding circuit," as previously explained. The timer contacts 24A are closed when the timer coil 24 is energized to start a timing cycle, typically fifteen seconds. During the timing cycle, power flows through contacts 24A and along a conductor 59 to the latching relay coil 20, causing the coil 20 mechanically to move contacts 20A, 20B and 21B to their "secondary positions." When in the secondary position the contact 20B energizes a conductor 60 so as to energize the coil 22 of the multi-contact relay 29, thereby causing the multi-contact relay 29 to change the contact positions of the contacts labeled 22A, 22B, 22C, 22D to effect change of the transceiver 25 from the receive condition to the transmit condition.

Also at this juncture the contact 20A closes connecting together conductors 29 and 50 so as to complete a circuit from the battery 15, the ignition switch 15A, the conductor 41, the contacts 13B, the conductor 49, the contact 20A, the conductor 50, the conductor 46 and the terminal 47, through the accident alarm 18 to the terminal 54 thereof, thence by way of the conductor 39 to the contacts 11B of the switch 11 and to ground 53B.

At this condition of the circuit, the alarm 18 is "on" and the transceiver 25 is transmitting the accident alarm signal. In the secondary position the contact 21B connects the conductor 42A to a conductor 61. The conductor 61, in turn, is connected to one side of the coil 23 of the timer relay 27 and, also, to one side of the transmitter indicator lamp 17A, the other side of each being connected to ground at 53B to complete the respective circuits. The timer relay 28 and the receiver indicator lamp 17B are de-energized when the contact 21B moves from the conductor 56 to the conductor 61.

At the end of its fifteen second timing cycle the contacts 24A of the time relay 28 open, the contact 21B moves over to the conductor 56 (as shown in FIG. 2) to initiate a fifteen-second primary cycle. During the primary cycle the coil 23 of the timer relay 27 is energized, closing the contacts 23A, energizing the coil 21 of the latching relay 26, thereby moving the contacts 20A, 20B, and 21B back to their primary positions. When this is done, the contact 20A opens the circuit to the accident alarm 18 and the contact 20B opens the circuit to the transmitter multi-contact relay 29, allowing contacts 22A, 22B, 22C, and 22D to return to their "primary positions" and switching the transceiver 25 from the transmit condition to receive condition. When this happens the contact 21B of latching relay 26 returns to contact the conductor 56 starting a new "switching time cycle," as explained previously. The latching relay 26 energizes the timer relay 28 thereby allowing the transceiver 25 to receive for fifteen seconds, after which time the timer relay 28 closes the circuit to the coil 20 of the latching relay 26. When this is done, the circuit to the timer relay 28 is opened, and the circuit to the timer relay 27 is closed, allowing the unit to transmit for 15 seconds. After 15 seconds, the timer relay 27 energizes the coil 21 of the latching relay 26, activating the timer relay 28 and allowing the unit to receive again for 15 seconds. The alternate conditions of receive and transmit are continued in this way. Upon receipt of an acknowledge signal from a direction-finding station during the receiving time cycle, an alarm-off switch 13 may be closed upon the contacts 13B; this opens the switch 11 and connects the transceiver 25 in a continuous receive cycle.

The foregoing describes the accident cycle; similar operation occurs in the breakdown cycle which is initiated by closing the switch labeled 12. When the breakdown buttom 12 is depressed or closed, the contacts 12A thereof complete a circuit from the conductor 31 to ground at 53A. Ground 53A also connects through contacts 12B and a conductor 40 to the terminal 55 of the breakdown alarm 19 (which performs the same function as the accident alarm 18 previously explained, but which emits an interrupted tone for transmittion, thereby to distinguish between the two distress conditions), the other side of which connects to the conductor 46. If it is necessary to communicate with a direction finder station, so as to explain to extent of bodily injury of the victims in the vehicle, for example, it is necessary to depress the accident button 11 and also the alarm-off button 13. When this is done, the total accident cycle is set into motion, as before explained, with the exception of the contact 13B which is normally-closed and which would be opened in this circumstance disconnecting the ground circuit from the accident alarm 18. The same explanation holds true in the case of a breakdown communication. The transceiver 25 can transmit in the transmitting cycle whether the alarms 18 and 19 are "on" or "off." A mechanical-off switch 14 de-energizes the whole system of FIG. 2.

Modifications of the invention described herein will occur to persons skilled in the art, and all such modifications are deemed to be within the spirit and scope of the invention as defined by the appended claims.

What is claimed is:

1. A system for noting the existence of a distress condition of a motor vehicle and the location of the vehicle within a limited geographical area, that comprises: transceiver means on the vehicle operable to transmit a multidirectional R.F. signal from the vehicle to a limited geographical area around the vehicle, the transmitter portion of the transceiver being low power of the order of 10 watts and the signal frequency being at least the order of 450MHz to assure limited transmission range of the signal, the occurrence of the signal being an indication of a distress-condition of the vehicle, said transceiver means also being operable to receive an R.F. incoming signal, timer means operable to cause the transceiver automatically to transmit and to receive R.F. signal as alternate conditions of transceiver operation, said transceiver means having means to override the automatic cycle to permit voice frequency transmission only or voice frequency receiving only; a plurality of radio direction finding devices adapted to receive the signal transmitted by the transceiver and to locate the source of the transmitted signal in terms of the direction thereof from each device; and display means to permit plotting the direction of the source of the signal from each radio direction finding device and, thus, permit determination of the vehicle location.

2. Apparatus as claimed in claim 1 in which the distress-condition of the vehicle is due to either a breakdown or an accident and in which means is provided to modulate the signal with predetermined different modulations depending upon the type of distress-condition encountered.

3. Apparatus as claimed in claim 2 in which the RF signal transmitter is limited by its transmitted frequency and power to a locally effective range of the order of 10 to 15 miles from the vehicle.

* * * * *